US008713626B2

(12) United States Patent
Cam-Winget et al.

(10) Patent No.: US 8,713,626 B2
(45) Date of Patent: Apr. 29, 2014

(54) NETWORK CLIENT VALIDATION OF NETWORK MANAGEMENT FRAMES

(75) Inventors: Nancy Cam-Winget, Mountain View, CA (US); Mark Krischer, Pymble (AU); Robert B. O'Hara, Jr., Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1626 days.

(21) Appl. No.: 11/295,327

(22) Filed: Dec. 6, 2005

(65) Prior Publication Data

US 2008/0295144 A1    Nov. 27, 2008

Related U.S. Application Data

(63) Continuation-in-part of application No. 10/687,075, filed on Oct. 16, 2003, now abandoned.

(51) Int. Cl.
*G06F 21/00* (2013.01)
(52) U.S. Cl.
USPC ............................................................ 726/1
(58) Field of Classification Search
USPC ............................................................ 726/1
See application file for complete search history.

(56) References Cited

U.S. PATENT DOCUMENTS

| | | | |
|---|---|---|---|
| 7,342,906 B1 * | 3/2008 | Calhoun | 370/338 |
| 2002/0176366 A1 * | 11/2002 | Ayyagari et al. | 370/245 |
| 2003/0018918 A1 * | 1/2003 | Natsuno et al. | 713/201 |
| 2003/0061503 A1 | 3/2003 | Katz et al. | |
| 2003/0084018 A1 * | 5/2003 | Chintalapati et al. | 707/1 |
| 2003/0211842 A1 * | 11/2003 | Kempf et al. | 455/411 |
| 2003/0217292 A1 * | 11/2003 | Steiger et al. | 713/201 |
| 2004/0044771 A1 * | 3/2004 | Allred et al. | 709/227 |
| 2006/0291455 A1 * | 12/2006 | Katz et al. | 370/355 |

OTHER PUBLICATIONS

Roshan, "A Comprehensive Review of 802.11 Wireless LAN Security and the Cisco Wireless Security Suite," Cisco Systems, Jul. 2002.*
Bernard Aboba, "IEEE 1802.11, Wireless LANs—IEEE 802.1X Pre-Authentication," Jun. 17, 2002, Microsoft Inc., pp. 1-47.*
http://www.tech-faq.com/wireless-networks/rsn-robust-secure-network.shtml, "What is RSN (Robust Secure Network)?", Sep. 2, 2004.
http://www.eetimes.com/printableArticle.jhtml?doc_id=OEG20021126S0003&_requestid= . . . , "Diving into the 802.11iSpec: A Tutorial", Sep. 2, 2004.

(Continued)

*Primary Examiner* — Matthew Smithers
(74) *Attorney, Agent, or Firm* — Baker Botts L.L.P.

(57) ABSTRACT

Methods and systems for use in a wireless client that includes one or more wireless network interfaces for communicating with at least one access point wherein the method enables the wireless client to validate the authenticity and integrity of received management frames. The method includes receiving a protected wireless network management frame from an access point verifying a message integrity check (MIC) appended to the protected wireless network management frame. One or more security policies are then conditionally applied based on a failure to verify the MIC.

17 Claims, 11 Drawing Sheets

(56) References Cited

OTHER PUBLICATIONS

Information technology—Telecommunications and information exchange between systems—Local and metropolitan area networks—Specific requirements—Part 11: Wireless LAN Medium Access Control (MAC) and Physical Layer (PHY) Specifications Sponsor, LANANSI/IEEE Std 802.11, 1999 Edition, Section 7. Frame Formats, pp. 34-58, Sponsor: LAN MAN Standards Committee of the IEEE Computer Society, 1999.

European Patent Office Extended European Search Report; Application No./Patent No. 06850226.9-1860 / 1958365 PCT/US2006061573; 7 pages, Jul. 2, 2013.

* cited by examiner

US 8,713,626 B2

NETWORK CLIENT VALIDATION OF NETWORK MANAGEMENT FRAMES

CROSS-REFERENCE TO RELATED APPLICATIONS

This application is a continuation-in-part application of U.S. patent application Ser. No. 10/687,075, entitled "System and Method for Protecting Network Management Frames", which was filed on Oct. 16, 2003 now abandoned and is herein incorporated by reference.

BACKGROUND

The IEEE (Institute of Electrical and Electronic Engineers) 802.11 standard provides guidelines for allowing users to wirelessly connect to a network and access basic services provided therein. It has become more evident in recent years that security and controlled access are necessities in light of the large amount of sensitive information that is communicated over networks today.

Traditionally, the security and controlled access efforts of wireless networking, and more specifically of layer 2 and the 802.11 MAC protocol have been directed toward protecting the data content of the transmission and not toward the prevention of session disruption. In other words, prior efforts have only been directed toward protecting the sensitivity of the content of the data transmitted and not toward the protection of the transmission of management frame packets which control the session integrity and quality.

Of course, access to a network can be restricted by any number of methods, including user logins and passwords, network identification of a unique identification number embedded within the network interface card, call-back schemes for dial-up access, and others. These conventional protection schemes are directed toward controlling the overall access to the network services and toward protecting the data transmissions.

Unfortunately, identifying information contained within the management frames transmitted via a network (e.g. IEEE 802.11 network) has not been the focus of protection in traditional security schemes. This lack of protection leaves the network vulnerable to attackers whereby an attacker can spoof a MAC address thereby impersonating valid stations. For example, such attacks can lead to session interruption by an imposter posing as a valid user sending a disassociation request which can result in disruption of the trusted user's session. Additionally, the integrity of management frames should also be protected. For example, some frame characteristics that could potentially be compromised include changing the destination address or perhaps values of information elements.

Additionally, a network session may also be crippled if an action management frame is impersonated or forged thereby affecting the quality of service as well as other capabilities.

In view of the foregoing, it may be useful to provide methods and systems that facilitate more extensive control between wireless entities such that the trust relationship includes the authentication of management frame data packets transmitted via the network to allow detection of a compromised connection, as well as preventing a connection from being compromised.

The foregoing examples of the related art and limitations related therewith are intended to be illustrative and not exclusive. Other limitations of the related art will become apparent to those of skill in the art upon a reading of the specification and a study of the drawings.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

Figure 1:
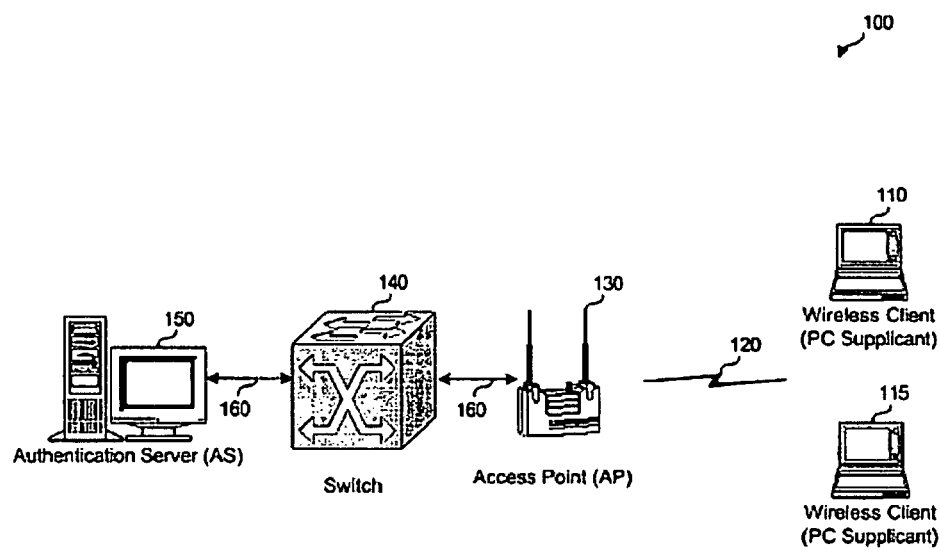
FIG. 1 illustrates a network block diagram that operates to control network access of wireless clients, in accordance with an exemplary embodiment.

The following embodiments and aspects thereof are described and illustrated in conjunction with systems, tools and methods which are meant to be exemplary and illustrative, not limiting in scope.

An embodiment by way of non-limiting example discloses a method for use in a wireless client which has one or more wireless network interfaces for communicating with at least one access point. The method includes associating with a wireless access point and authenticating to an authentication server. One or more security policies are then conditionally applied based on a failure to authenticate to the authentication server.

Another embodiment by way of non-limiting example discloses a method for use in a wireless client which has one or more wireless network interfaces for communicating with at least one access point. The method includes associating with a wireless access point, authenticating to an authentication server and generating a session key. A security policy is then conditionally applied based on a failure to authenticate to the authentication server and/or generating the session key.

Yet another embodiment by way of non-limiting example discloses a method for use in a wireless client which has one or more wireless network interfaces for communicating with at least one access point. The method includes receiving a wireless network management frame from an access point and verifying a message integrity check (MIC) appended to the frame. Also included is authenticating to an authentication server and conditionally applying one or more security policies based on a failure to verify the MIC.

Still another embodiment by way of non-limiting example discloses a method for use in a wireless client which has one or more wireless network interfaces for communicating with at least one access point. The method includes transmitting a re-association request to an access point and receiving a re-association response that includes a message integrity check (MIC). The MIC is verified and one or more security policies are conditionally applied if the MIC can not be verified.

Another embodiment by way of non-limiting example includes a method for preventing a rogue wireless client from connecting to an access point. The method includes receiving a re-association request that contains a message integrity check (MIC) from a wireless client and broadcasting a roam event associated with the re-association request to other access points to receive connection state information that includes one or more keys for the wireless client. The message integrity check is then verified and a connection is established if the MIC is valid. Finally, one or more security policies are conditionally applied if the MIC can not be verified.

The following includes definitions of selected terms used throughout the disclosure. The definitions include examples of various embodiments and/or forms of components that fall within the scope of a term and that may be used for implementation. Of course, the examples are not intended to be limiting and other embodiments may be implemented. Both singular and plural forms of all terms fall within each meaning:

"Computer-readable medium", as used herein, refers to any medium that participates in directly or indirectly providing signals, instructions and/or data to one or more processors for execution. Such a medium may take many forms, including but not limited to, non-volatile media, volatile media, and transmission media. Non-volatile media may include, for example, optical or magnetic disks. Volatile media may include dynamic memory. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, a PROM, an EPROM, a FLASH-EPROM, any other memory chip or cartridge, a carrier wave/pulse, or any other medium from which a computer, a processor or other electronic device can read. Signals used to propagate instructions or other software over a network, such as the Internet, are also considered a "computer-readable medium."

"Internet", as used herein, includes a wide area data communications network, typically accessible by any user having appropriate software.

"Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like. Logic may also be fully embodied as software.

"Software", as used herein, includes but is not limited to one or more computer readable and/or executable instructions that cause a computer or other electronic device to perform functions, actions, and/or behave in a desired manner. The instructions may be embodied in various forms such as objects, routines, algorithms, modules or programs including separate applications or code from dynamically linked libraries. Software may also be implemented in various forms such as a stand-alone program, a function call, a servlet, an applet, driver code, instructions stored in a memory, part of an operating system or other type of executable instructions. It will be appreciated by one of ordinary skill in the art that the form of software may be dependent on, for example, requirements of a desired application, the environment it runs on, and/or the desires of a designer/programmer or the like.

The following includes examples of various embodiments and/or forms of components that fall within the scope of the present system that may be used for implementation. Of course, the examples are not intended to be limiting and other embodiments may be implemented without departing from the spirit and scope of the claimed embodiments.

The IEEE (Institute of Electrical and Electronic Engineers 802.11 standard provides guidelines for allowing users to wirelessly connect to a network and access basic services provided therein. The content of the IEEE 802.11 specification standard and the 802.11i standard is hereby incorporated into this specification by reference in its entirety.

Although the embodiments of present system and method described herein are directed toward an IEEE 802.11 wireless network, it will be appreciated by one skilled in the art that the present concepts and innovations described herein may be applied to alternate wired and wireless network protocols without departing from the spirit and scope of the present innovation.

Briefly describing one embodiment of the present system, it provides for a network suitably configured to authenticate and protect the transmission of management frames in a wireless network thereby potentially preventing session disruption. Specifically, one embodiment of the present innovation is directed toward a system and method configured to establish unique keys in order to protect the security of management frames transmitted in an 802.11 authenticated network session.

In other words, the system may be configured to establish a secure key corresponding to management frame transmission. This secure key may be suitably configured to enable the computation of a message integrity check (MIC) used to authenticate 802.11 management frames. In accordance with the present system and method, it will be appreciated that the key may be established in the same manner as the keys derived to protect data packets or 802.1x EAPOL key messages are presently handled in accordance with the IEEE 802.11i standard.

The disclosed system and method set forth provides for protection of management frames over an 802.11 network following the establishment of trusted relationships between an authenticator and a number of supplicants or clients. The following embodiments will be described directed toward an access point (AP) as the authenticator and the wireless clients (PCs) as the supplicants. As well, the following embodiments will be directed toward an AP as a receiver and a wireless client as a transmitter of a management frame packet, and vice versa.

Of course, alternate embodiments of the present system and method may be configured utilizing other authenticator and supplicant components. For example, it will be appreciated that the authenticator may be an access point, switch, authentication server or the like. As well, it will be appreciated that a supplicant may be any device capable of transmitting and receiving packets via an 802.11 wireless network such as a personal data assistant (PDA), digital phone, electronic tablet, or the like.

In accordance with an embodiment of the present system and method, upon establishment of the trust relationship between an AP and corresponding wireless clients, the wireless clients are recognized as trusted wireless clients and accordingly are able to access the services of the network. Therefore, as a result of the trusted relationship, information may be securely communicated between the wireless clients and the AP.

As previously stated, one embodiment of the present system and method is directed toward establishing a unique key to be used either in providing both privacy and computing a MIC or only in computing a MIC to validate and authenticate the transmission and reception of management frame packets via a wireless network. For example, if the receiver receives a management frame packet with an incorrect MIC, the receiver would discard the received packet and ignore the information contained therein.

It will be appreciated that additional and/or alternate management frame protection methods may be used in accordance with the present system and method. For example, in accordance with an embodiment, the present system and method may be suitably configured to generate a sequential replay protection counter to assist in verification of management frame packets. In a preferred embodiment, this replay protection value may be used in conjunction with the MIC value previously described.

Illustrated in FIG. 1 is a simplified system component diagram of one embodiment of the present system 100. The system components shown in FIG. 1 generally represent the system 100 and may have any desired configuration included within any system architecture.

The following is a general description of a wireless network architecture in accordance with one preferred embodiment. The architecture is described generally in order to disclose the manner in which a key may be generated and applied to provide management frame protection and security.

Referring now to FIG. 1 an embodiment of the system generally includes wireless clients 110, 115 suitably configured and operatively connected to access services on a wireless network 120 via an AP 130. It will be appreciated that the wireless clients 110, 115 may be any component capable of transmitting via a wireless network such as a laptop/notebook portable computer having Cardbus network adapter suitable for wireless communication with a wired network, an electronic tablet having a suitable wireless network adapter, a handheld device containing a suitable wireless network adapter for communicating to a wired network or the like.

As illustrated in FIG. 1, an AP 130 may be configured to provide the communicative transition point between the dedicated wired network 160 and the wireless clients (or supplicants) 110, 115. Additionally, a basic wireless network (e.g. IEEE 802.11) implementation may include a switch 140 suitably configured to operate to provide interconnectivity between a plurality of network devices disposed on the wired network 160 and optionally between a plurality of networks (not shown).

An authentication server (AS) 150 may be disposed on the wired network 160 suitably configured to provide authentication services to those network entities requiring such a service. Of course, it will be appreciated that the AS 150 and corresponding functionality may be employed as a stand alone component or combined within another existing component. In other words, the functionality of the AS 150 may be included within the switch 140 or the AP 130.

In one embodiment, the AS 150 provides the authentication and authorization services to any network entity that functions as an authenticator. A network entity can take the role of an authenticator when that entity performs authentication in conjunction with the AS 150 on behalf of another entity requesting access to the network.

For example, the authentication server determines, from credentials provided by the wireless clients 110, 115, whether the wireless clients 110, 115 are authorized to access the services controlled by the authenticator (e.g. switch 140, or AP 130). It will be appreciated that the AS 150 can be co-located with an authenticator, or it can be accessed remotely via a network to which the authenticator has access. Additionally, the network 160 can be a global communication network, e.g., the Internet, such that authentication occurs over great distances from a remote location disposed thereon to the AS 150.

In one embodiment, component authentication may occur upon system initialization. Alternatively, component authentication may occur when a supplicant (e.g. wireless client 110, 115) requests connection to a port of an authenticator system or when authorized access has become unauthorized, and subsequently requested to be re-authorized.

In accordance with the present system and method, the wireless clients 110, 115 may be configured to authenticate to the AS 150 utilizing any one of a number of authentication algorithms. For example, the present system and method may be configured to utilize authentication algorithms such as EAP-FAST or EAP-TLS or the like.

In operation, the trust relationship is established with the wireless clients 110, 115 in the following manner. Once the dedicated network 160 is operational and the wired entities (130, 140, 150) have established proper connectivity, authentication of the wireless clients 110, 115 is commenced.

The wireless clients 110, 115, using wireless protocols, may communicate a connection request via a communication link 120 to the AP 130, and which AP 130 now takes on an authenticator role. The AP 130 processes the connection request message by sending the wireless client 110, 115 authentication request to the AS 150.

The packet information may be sent to the switch 140 such that the switch 140 recognizes the traffic as coming only from the AP 130. Because the switch 140 then recognizes the traffic as coming from the authorized AP 130, the packet is passed through to the AS 150 for authentication.

Until such authorization of the wireless clients 110, 115 occurs, the AP 150 restricts any uncontrolled traffic of the wireless clients 110, 115 beyond the AP 130. In other words, the AS only allows the wireless clients 110, 115 to access to the AP 130 in order to perform authentication exchanges, or access services provided by the AP 130 that are not subject to access control restrictions placed on that port.

The AP 130 and the AS 150 may be suitably configured to exchange information using a protocol such as RADIUS (Remote Access Dial in User Service) until the AS 150 has completed its authentication of the wireless clients 110, 115 and reported the outcome of the authentication process to both the AP 130 and the wireless clients 110, 115.

Next, the AS 150 informs the AP 130 of the outcome of the authentication request. Depending upon the outcome of the authentication process, the AS 150 communicates to the AP 130 the security policy that may be used to control the traffic from the wireless clients 110, 115. In one embodiment, the security policy are unique keys that the AP 130 and wireless client 110, 115 may use to secure communications between the AP 130 and wireless client 110, 115.

In accordance with one embodiment, the AS 150 communicates an additional client-specific key that may be suitably configured to secure the communication of management frame packets from the wireless clients 110, 115 to the AP 130.

For example, the wireless clients 110, 115 may also forward other information to the AP 130 such as management frame packets (e.g. quality-of-service (QoS) parameters) corresponding to the wireless clients 110, 115. In accordance with the present system and method, these management frame packets may be configured to include a client-specific information element (IE). This IE may be configured to contain a message authentication or integrity check (referred to as a "MIC" in the 802.11i standard and hereinafter throughout the present specification). Additionally, the IE may include a replay protection value.

It will be appreciated that the key used to generate the management frame MIC may be derived in the same manner the keys used to protect data packets or 802.1X EAPOL key messages in accordance with the 802.11 standard are derived. As well it will be appreciated that the management frame protection keys may be derived during the wireless client authentication process as described above. Still further, the keys used to protect data packets may also be used to protect the management frames. Additionally, it will be appreciated that security strength is usually directly related to the strength of the mechanism used to derive the keys.

Furthermore, it will be appreciated that any method or counting scheme may be used to generate a replay protection value. For example, a sequential counter initialized to zero upon authentication may be used in accordance with one embodiment. Subsequently, the replay protection value may be embedded into the IE along with the MIC and transmitted with the management frame packets. In addition to the sequential counter, an access point's TSF timestamp could be used alone or in combination with the counter.

Continuing with the example, trust relationships between wireless clients 110, 115 and the AP 130 are formed across the network channel. It will be understood that additional wireless clients (not shown) connected to the network may have a correspondingly unique message authentication check (e.g. MIC) key.

In accordance with the present system and method, received management frame packets communicated between the AP 130 and wireless clients 110, 115 may be validated by checking message digests (e.g. MIC). The message digests may be calculated by using the message authentication check key that was established during authentication.

In accordance with the present system and method, client-specific unique keys and corresponding MICs are generated to secure transmission of management information between the wireless clients 110, 115 and the AP 130. It will be appreciated that the management frame key may be derived in the same manner as the session keys referred to as the Pairwise Transient Keys (PTK) are derived as defined by the 802.11i standard. Further, it will be appreciated that the key used to protect the management frame packets may be derived as an extension to the PTK derivations.

In other words, upon receipt of a management frame packet from a trusted wireless client (e.g. 110, 115), the AP 130 may be suitably configured to validate the IE prior to accepting the management frame packet. For example, the AP 130 may be suitably configured to compare the received replay protection value with locally stored or calculated values.

Additionally, the AP 130 may be suitably configured to generate a local MIC value derived from the client-specific management frame authentication key. The AP 130 may be suitably configured to compare the locally calculated MIC value with the MIC value embedded in the management frame IE received from the wireless client (e.g. 110, 115). As a result of this authentication process, the AP 130 may make a determination to process or discard the management frame.

In addition, the AP 130 may be suitably configured to generate a local replay protection value. For example, the AP 130 may be configured to establish a local replay protection value from a locally administered sequence counter. This locally established replay protection value may be compared to the received replay protection value in order to verify the authentication of the transmitter. The process flow of the present and system and method may be better understood with reference to FIG. 2.

In addition, the AP 130 may be suitably configured to generate a local replay protection value. For example, the AP 130 may be configured to establish a local replay protection value from a locally administered sequence counter. This locally established replay protection value may be compared to the received replay protection value in order to verify the authentication of the transmitter. The process flow of the present and system and method may be better understood with reference to FIG. 2.

Figure 2:
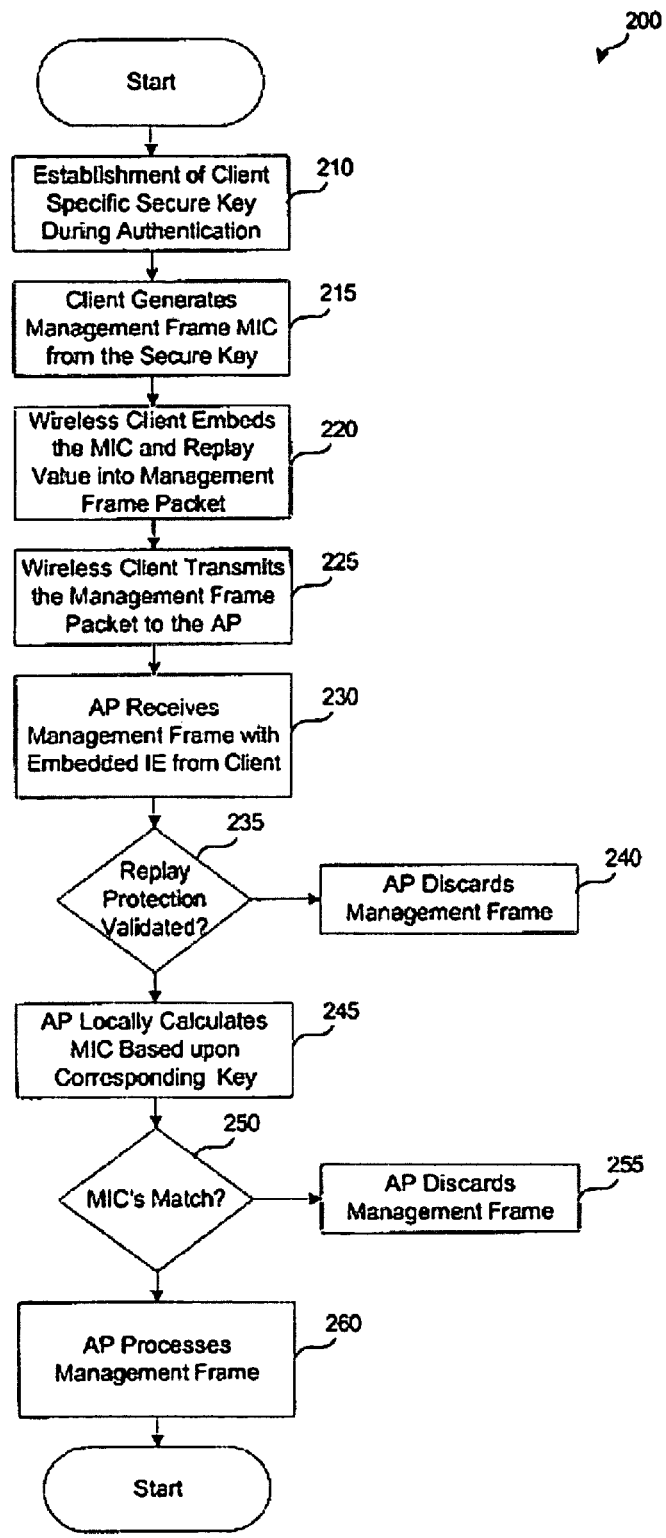
FIG. 2 illustrates a flow chart of the information exchange between the various entities for authenticating and validating the transmission of management frame data, in accordance with an exemplary embodiment.

Illustrated in FIG. 2 is an embodiment of a methodology 200 associated with the present system and method. Generally, FIG. 2 illustrates the process used to establish and validate the MIC and the replay protection value transmitted together with a management frame packet via a wireless network. Furthermore, FIG. 2 presumes that the key used to generate the MIC has been established during authentication; for example, as part of the extended PTK derivation in accordance with the IEEE 802.11i standard.

The illustrated elements denote "processing blocks" and represent computer software instructions or groups of instructions that cause a computer or processor to perform an action(s) and/or to make decisions. Alternatively, the processing blocks may represent functions and/or actions performed by functionally equivalent circuits such as a digital signal processor circuit, an application specific integrated circuit (ASIC), or other logic device. The diagram, as well as the other illustrated diagrams, does not depict syntax of any particular programming language. Rather, the diagram illustrates functional information one skilled in the art could use to fabricate circuits, generate computer software, or use a combination of hardware and software to perform the illustrated processing.

It will be appreciated that electronic and software applications may involve dynamic and flexible processes such that the illustrated blocks can be performed in other sequences different than the one shown and/or blocks may be combined or separated into multiple components. They may also be implemented using various programming approaches such as machine language, procedural, object oriented and/or artificial intelligence techniques. The foregoing applies to all methodologies described herein.

Referring now to FIG. 2, there is illustrated a flow chart of an embodiment of the methodology 200 for authentication and validation of a wireless client management frame transmission. The embodiment presumes the pre-establishment of a trusted relationship between all components of the system (e.g. wireless client, AP, switch, AS).

Initially, at block 210, as a result of the authentication process as described above, a client-specific secure key is established to be used for the protection of management frame transmission on the network. Next, at block 215, the wireless client locally employs the key for protecting management frames by using the key to generate a MIC to secure the transmission of the management frame packets to the AP.

An information element (IE) containing the MIC and a replay protection value is embedded within management frame packets (block 220). Once embedded, the wireless client transmits the management frame packet including the IE via the network to the AP (block 225). On the wireless side of the network, the AP receives the management frame transmission from the wireless client including the IE (block 230).

It will be appreciated that the methodology 200 illustrated in FIG. 2 describes the transmission of a single management frame packet by the wireless client.

One skilled in the art will recognize that any number of management frame transmissions may be sent during a single communication session. Accordingly, the methodology 200 of FIG. 2 as described may be applied to each individual management frame transmission.

Continuing with the embodiment, the replay protection value included in the IE is validated (decision block 235). In one example, the replay protection value may be a counter value that is initialized to zero at the time the "enhanced-PTK" is derived. It will be appreciated that the key established to protect management frames is referred to herein as the "enhanced-PTK" and may be established in accordance with the IEEE 802.11i standard.

In accordance with the embodiment, at decision block 235, the counter value is verified to be a value of one greater than the previously transmitted frame. In other words, the counter value may be a sequential number generated from the zero value initiated upon the generation of the "enhanced-PTK" and increased upon the transmission of each protected management frame. Of course, it will be appreciated that any replay protection scheme may be used in alternate embodiments without departing from the spirit and scope of the preferred embodiments.

If the replay counter value is not validated (e.g. does not equal the next sequential number greater than the previously received management frame), the received management frame is discarded by the AP (block 240).

If at block 235 the replay counter value is validated, the AP locally calculates a MIC based upon the corresponding unique enhanced-key for the wireless client (block 245). It will be appreciated that any suitable method or hash function may be used to compute the MIC. For example, the MIC computation may be a one way hash function, such as an HMAC-SHA1 or AES-128-CMAC that serves as the message authentication value for the management frame.

Next, at decision block 250, the AP compares the received client MIC key with the AP locally calculated MIC to determine if the client management transmission is an authorized transmission. If at decision block 250 the received MIC does not match the locally calculated MIC, the AP discards the management frame (block 255). On the other hand, if, at decision block 255, the MIC received does match the MIC calculated by the AP, the AP consumes and processes the management frame (block 260).

As discussed in more detail below, wireless clients may also be configured to authenticate wireless management frames transmitted by access points in the same manner discussed above. For example, wireless clients can validate wireless management frames based on MICs and replay protection values contained in IEs appended to the management frames. Still further, the wireless clients can monitor for anomalies detected during attempts to access the network infrastructure. The wireless clients may also be configured to apply one or more security policies in response to detected MIC and/or replay protection failures, as well as anomalies detected during connection attempts. For example, in one implementation, a security policy may cause the wireless client to store data characterizing a failure or anomaly and transmit it to a network management device after a successful connection has been established.

Several advantages are realized by utilizing the claimed embodiments which will be subsequently detailed. For example, a mechanism can be realized wherein a wireless client can simply disregard spoofed management frames. In one case, a rogue access point may spoof a legitimate access point and send disassociation requests to wireless clients in order to disconnect them from legitimate access points. The point of doing so is to attempt to disrupt the session, and possibly have the disconnected wireless clients to connect to the rogue access point. However, with the claimed embodiments in place, the wireless client will simply disregard the disassociation request and continue to be connected to legitimate access points.

Yet another advantage of the claimed embodiments is that every wireless client can now potentially be a potential rogue access point detector whereas before only access points served this function. By sending reports of potential rogue clients to a centralized intelligence (for example, a wireless controller or a wireless LAN solution engine (WLSE)), with information such as received signal strength indicator (RSSI), the location of a rogue access point can potentially be identified. With this information in hand, the rogue access point can potentially be located and shut down. Similarly, the same information can also be used to identify a legitimate access point that was perhaps illegitimately taken over.

In conjunction with the claimed embodiments, an exemplary wireless network will now be described.

Exemplary Wireless Network System Architecture
Network Topology

Figure 3:
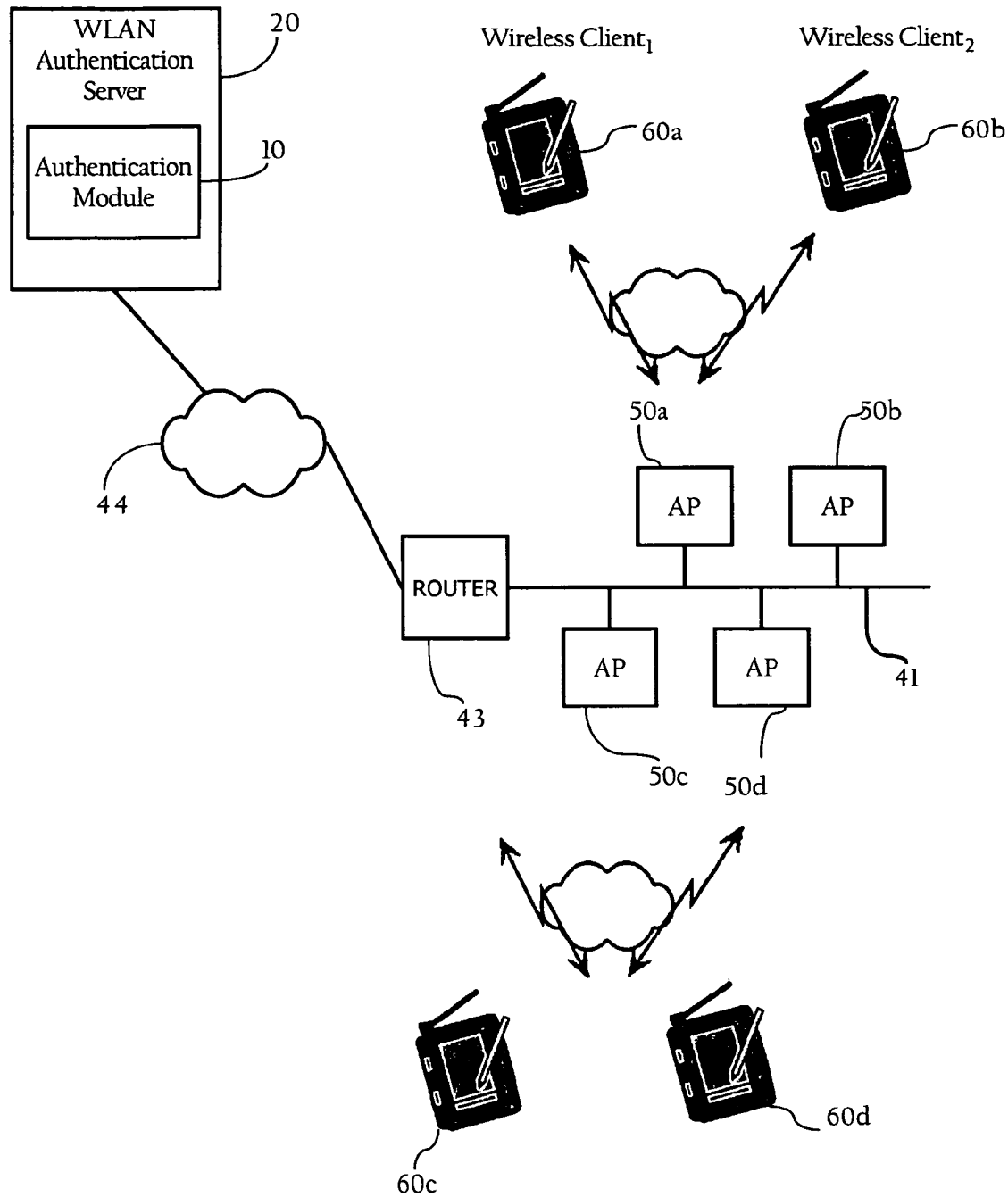
FIG. 3 is a topological diagram of components in a wireless local area network system, in accordance with an exemplary embodiment.

A network environment according to one implementation of the claimed embodiments is shown in FIG. 3. In a specific embodiment, the system includes an authentication module 10 running on a network authentication server 20, a router 43, a local area network (LAN) 41, and wireless access points 50a, 50b, 50c, and 50d (collectively referred to as wireless access points 50). LAN 41 is implemented by a switch (or an array of switches) and/or other network devices, such as a bridge.

As described in more detail below, in one implementation, network authentication server 20 comprises authentication module 10 which may be a RADIUS server, but may be any other type of authentication server. As FIG. 1 illustrates, these network elements are operably connected to a network 44. Network 44, in one implementation, generally refers to a computer network, such as a LAN, a WAN, etc., that includes one or more intermediate network devices (e.g., routers, switches, etc.), which allow for the transmission of messages between network authentication server 20 and wireless access points 50. Of course, network 44 can include a variety of network segments, transmission technologies and components, such as terrestrial WAN links, satellite links, and cellular links. Network 41 may be a LAN or LAN segments implemented by an Ethernet switch (not shown) or an array of switches having multiple ports to which wireless access points 50 are connected. The wireless access points 50 are typically connected to the switch ports via Ethernet links; however, other link layer connection protocols or communication means can be employed. FIG. 3 illustrates one possible network environment in which the claimed embodiments may operate; however, other implementations are possible. For example, although network authentication server 20 is illustrated as being on a different LAN or LAN segment, it may be co-located with wireless access points 50.

The wireless access points 50 are operative to wirelessly communicate with remote wireless client devices 60*a*, 60*b*, 60*c*, and 60*d*. In one implementation, the wireless access points 50 implement the wireless network protocol specified in the IEEE 802.11 WLAN specification. The wireless access points 50 may be autonomous or so-called "fat" wireless access points, or light-weight wireless access points operating in connection with a wireless switch (not illustrated), as disclosed in U.S. patent application Ser. No. 10/407,584, now U.S. Pat. No. 7,212,837. In addition, the network infrastructure may also include a Wireless LAN Solution Engine (WLSE) offered by Cisco Systems, Inc. of San Jose, Calif. or other wireless network management system. Furthermore, U.S. patent application Ser. No. 11/195,536 discloses methods and systems for automatically assigning an identity to, and configuring, the wireless access points 50. Of course, configuration and management information can be obtained in a variety of manners without departing from the scope of the claimed embodiments.

In one implementation, the wireless clients and the wireless network infrastructure, including the wireless access points 50 and authentication module 10, implement a security mechanism to encrypt and secure wireless communications. In one implementation, the wireless clients and the wireless network infrastructure employ a network access protocol, such as the IEEE 802.1X standard, which employs the Extensible Authentication Protocol (EAP). This protocol provides an authentication framework that supports methods for authenticating and authorizing network access for the wireless clients. Still further, in one implementation, the wireless clients and the wireless network infrastructure implement the security and encryption mechanisms specified in the IEEE 802.11i specification. As discussed below, the encryption mechanisms, in one implementation, involve the generation and use of Pairwise Master Keys and Pairwise Transient Keys. In one implementation, a pairwise master key is a code or string derived from a master secret, and is used to derive a Pairwise Transient Key (PTK). Accordingly, a Pairwise Transient Key is a value string derived from a pairwise master key (PMK). According to the IEEE 802.11i specification, the PTK is split into multiple encryption keys and message integrity code (MIC) keys for use by a wireless client and the wireless network infrastructure as temporal session keys. Other encryption and security mechanisms can also be used, such as the PPP protocol. As discussed above, an embodiment of the system can extend the 802.11i functions to create keys for the protection of management frames; however, in other embodiments, the PTKs used to protect and authenticate the data frames can also be used for the management frames transmitted by the wireless clients and the access points.

Authentication module 10, in one implementation, is operative to authenticate wireless users to allow access to network resources available through wireless access points 50. In one implementation, authentication module 10 implements Remote Authentication Dial In User Service (RADIUS) functionality, as disclosed in RFCs 2138, 2865, and 2866. As described more fully below, when a wireless client attempts to connect to the wireless network, the access point 50 proxies the authentication session between the wireless client and authentication module 10.

Network Authentication Server

Figure 4:
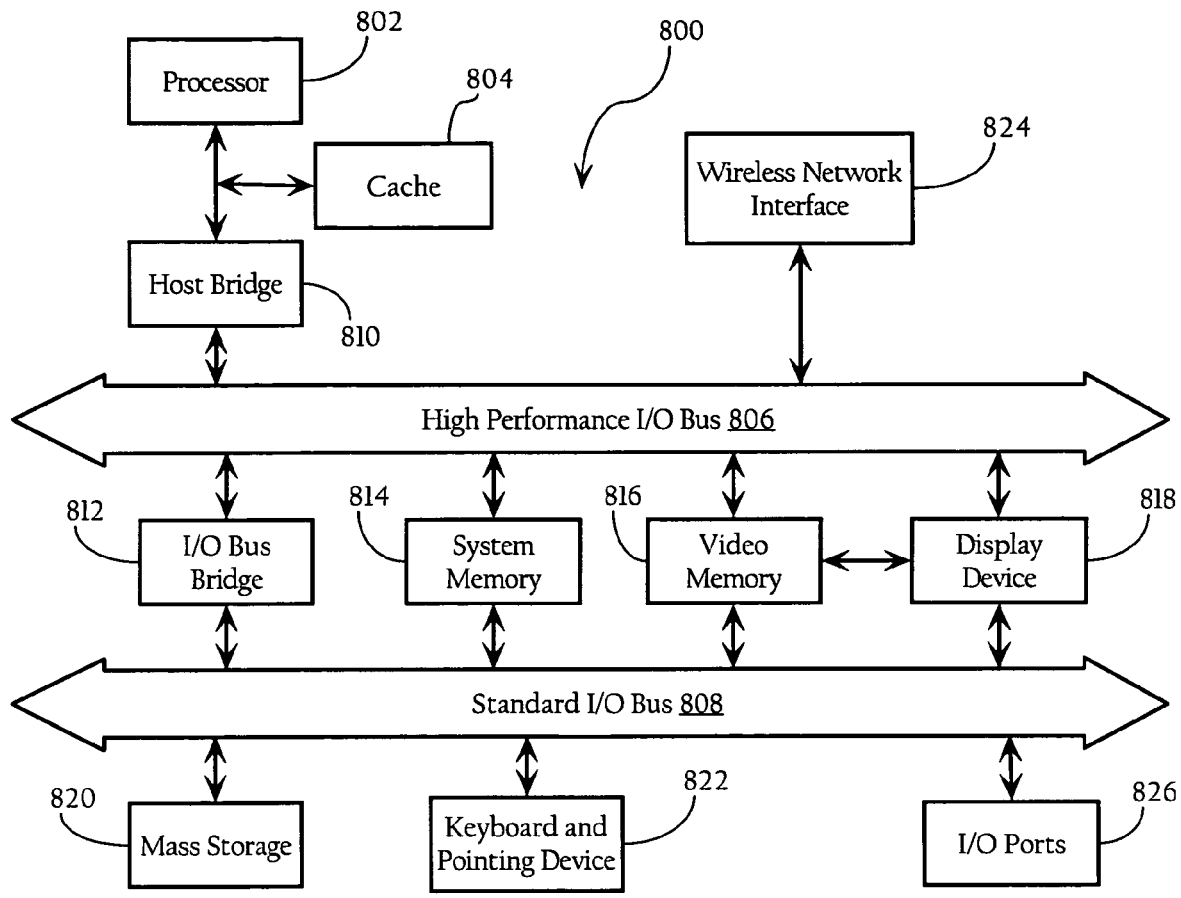
FIG. 4 illustrates for didactic purposes a hardware system 800, which can be used to implement a wireless client 60 of FIG. 3, in accordance with an exemplary embodiment.

FIG. 4 illustrates for didactic purposes a hardware system 800, which can be used to implement a wireless client 60 of FIG. 3, in accordance with an exemplary embodiment. In one embodiment, hardware system 800 includes processor 802 and cache memory 804 coupled to each other as shown. Additionally, hardware system 800 includes high performance input/output (I/O) bus 806 and standard I/O bus 808. Host bridge 810 couples processor 802 to high performance I/O bus 806, whereas I/O bus bridge 812 couples the two buses 806 and 808 to each other. Coupled to bus 806 are network/communication interface 824, system memory 814, and video memory 816. In turn, display device 818 is coupled to video memory 816. Coupled to bus 808 are mass storage 820, keyboard and pointing device 822, and I/O ports 826. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 800 perform the functions described below. In particular, wireless network interface 824 is used to provide communication between system 800 and any of a wide range of wireless networks, such as a WLAN (e.g., IEEE 802.11), etc. Mass storage 820 is used to provide permanent storage for the data and programming instructions to perform the above described functions implemented in the system controller, whereas system memory 814 (e.g., DRAM) is used to provide temporary storage for the data and programming instructions when executed by processor 802. I/O ports 826 are one or more serial and/or parallel communication ports used to provide communication between additional peripheral devices, which may be coupled to hardware system 800.

Hardware system 800 may include a variety of system architectures and various components of hardware system 800 may be rearranged. For example, cache 804 may be on-chip with processor 802. Alternatively, cache 804 and processor 802 may be packed together as a "processor module", with processor 802 being referred to as the "processor core". Furthermore, certain implementations of the present invention may not require nor include all of the above components. For example, the peripheral devices shown coupled to standard I/O bus 808 may be coupled to high performance I/O bus 806. In addition, in some implementations only a single bus may exist with the components of hardware system 800 being coupled to the single bus. Furthermore, additional components may be included in system 800, such as additional processors, storage devices, or memories.

In one embodiment, the operations of wireless client-side roaming functionality are implemented as a series of software routines run by hardware system 800. These software routines, which can be embodied in a wireless network interface driver, comprise a plurality or series of instructions to be executed by a processor in a hardware system, such as processor 802. Initially, the series of instructions are stored on a storage device, such as mass storage 820. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 824. The instructions are copied from the storage device, such as mass storage 820, into memory 814 and then accessed and executed by processor 802. In alternate embodiments, the present invention is implemented in discrete hardware or firmware.

While FIG. 4 illustrates, for didactic purposes, the hardware architecture of a wireless client according to one implementation of the present invention, the present invention, however, can be implemented on a wide variety of computer system architectures, such as dual-mode cellular phones, wireless VoIP phones, Personal Digital Assistants, Laptop computers, and the like. An operating system manages and controls the operation of system 800, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP operating system, available from Microsoft Corporation of Redmond, Wash. However, the present invention may be used with other operating systems, such as the Apple Macintosh Operating System, available from Apple Computer Inc. of Cupertino, Calif., UNIX operating systems, LINUX operating systems, and the like.

Access Point

Figure 5:
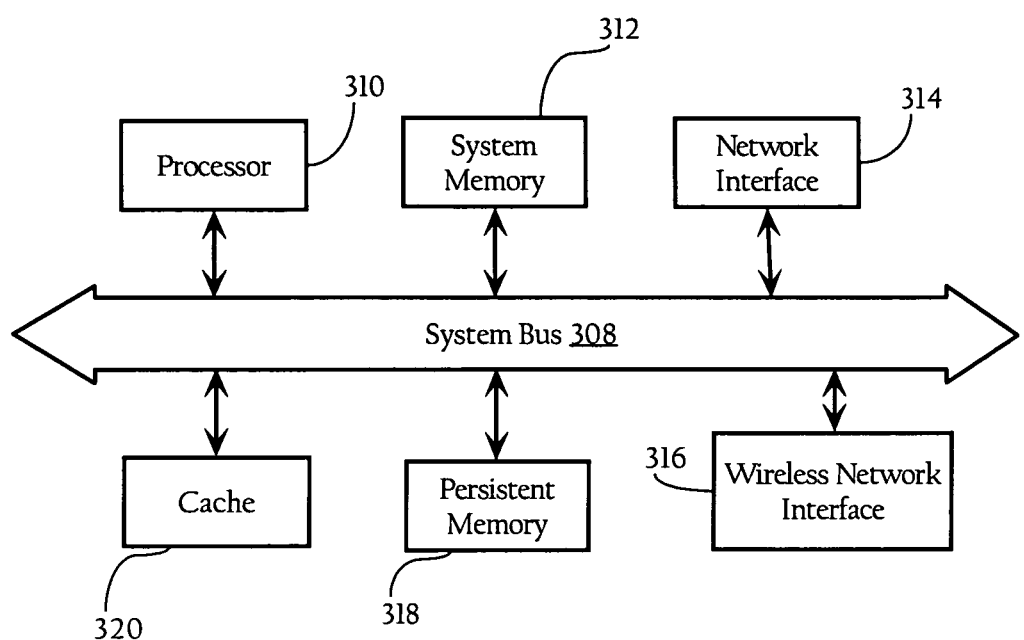
FIG. 5 is a functional block diagram illustrating the components of an access point, in accordance with an exemplary embodiment.

FIG. 5 illustrates for didactic purposes a wireless access point, which can be used to implement a wireless access point of FIG. 3. In one implementation, the wireless access point comprises a processor 310, a memory 312, a network interface 314 (e.g., an 802.3 interface) for communication with a LAN, a wireless network interface 316 (e.g., an IEEE 802.11 WLAN interface) for wireless communication with one or more wireless clients 60, a persistent memory 318, a cache 320 for storing VLAN information, and a system bus 308 interconnecting these components. The wireless access points 50 may also include software modules (including DHCP clients, Cisco® Discovery Protocol (CDP) modules, wireless access point modules, SNMP functionality, etc.) and device drivers (e.g., network and WLAN interface drivers) stored in the persistent memory 318 (e.g., a hard disk drive, flash memory, etc.). At start up, these software components are loaded into memory 312 and then accessed and executed by processor 310.

802.11i Key Generation

Figure 6:
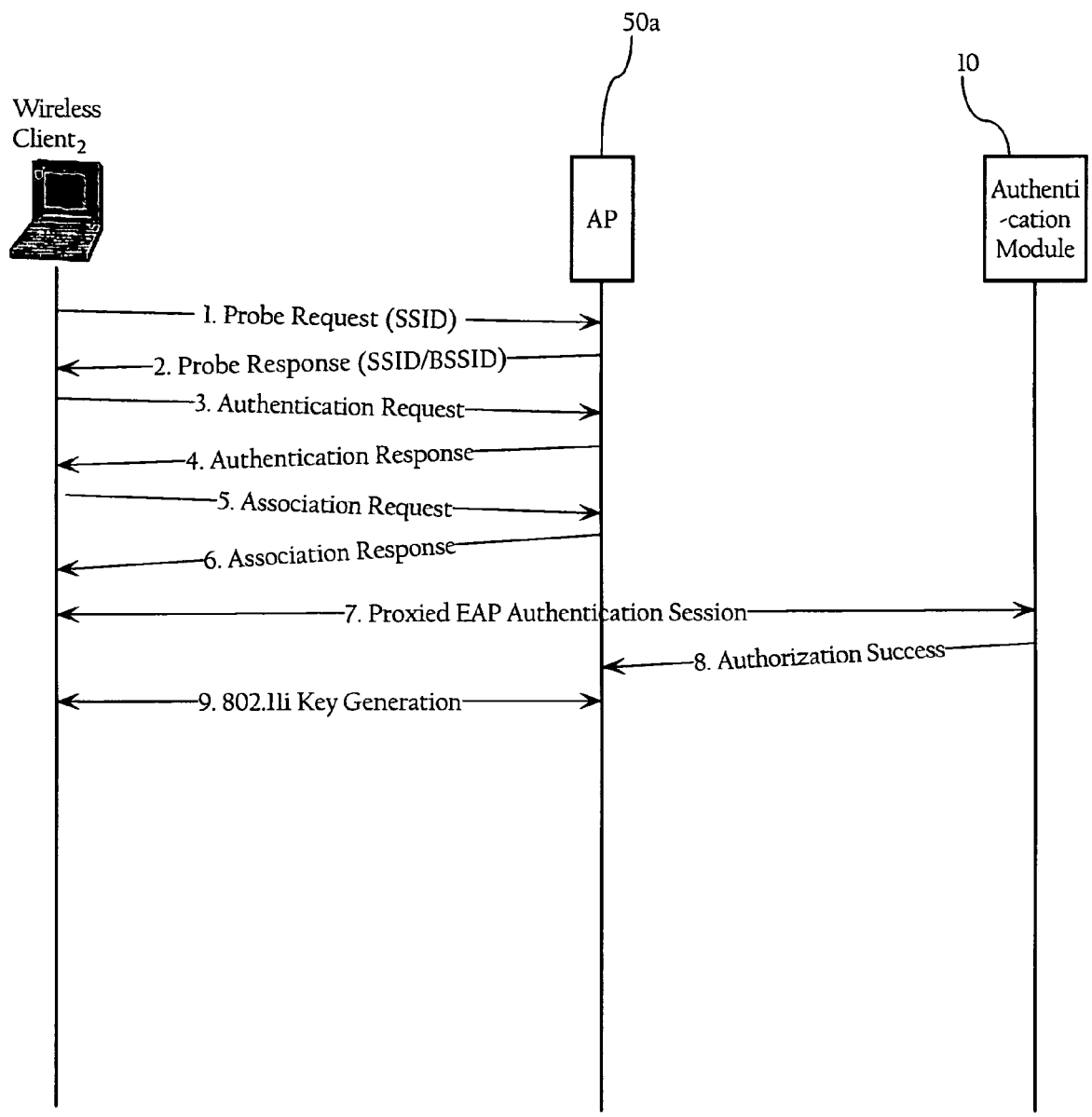
FIG. 6 is a diagram illustrating information flow among a wireless client, an access point, and a network authentication server in accordance with an exemplary embodiment.

FIG. 6 is a diagram illustrating a possible message flow among a wireless client, an access point 50*a*, and authentication module 10 in accordance with one implementation of the claimed embodiments. Initially, a wireless client will send a probe request to an access point 50*a* and the access point 50*a* responds with a probe response. In a similar manner, authentication and association messages are also exchanged. Once a wireless connection is successfully completed, a proxied EAP authentication session is initiated utilizing authentication module 10. Upon completion of authentication, an 802.11i key generation is initiated and a communications system is commenced.

Several preferred embodiments will now be presented illustrating various methods for preventing a rogue access point from trying to gain access to a wireless client. Additionally, a method will be described for preventing a rogue access point from gaining access to a legitimate access point.

Figure 7:
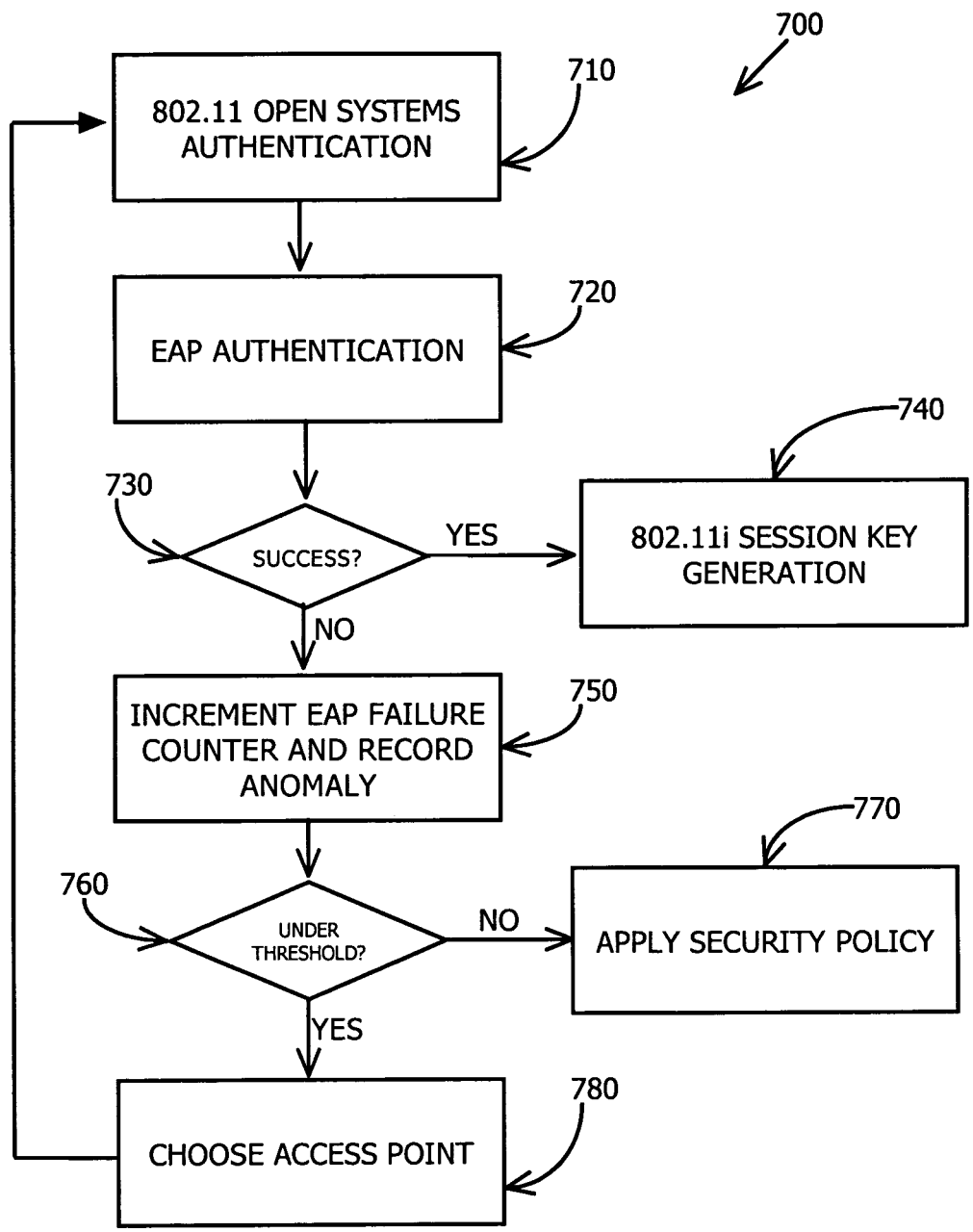
FIG. 7 is a flowchart illustrating a method, implemented by a wireless client, directed to monitoring for anomalies during association with a wireless network infrastructure, in accordance with an exemplary embodiment.

FIG. 7 is a flowchart illustrating a method 700 executed by a wireless client, in accordance with an exemplary embodiment, directed to the detection of anomalies while attempting to establish access to the network through a wireless access point. In one embodiment, the method can be implemented by wireless network driver code as a process that monitors various events (e.g., EAP authentication sessions, 802.11i key generations sessions, etc.) associated with establishing network access and conditionally applies one or more security policies based on one or more detected anomalies. As FIG. 6 illustrates, the method, in one embodiment, commences with a wireless client initiating an open systems authentication step 710 with an access point (see FIG. 6, Nos. 1-6). Upon a successful connection with the access point 50*a*, the access point 50*a* proxies an authentication session (e.g., EAP authentication) between the wireless client and the network authentication server (720) (see also FIG. 6, No. 7). If the wireless client successfully authenticates (730), the network authentication server 20 returns an authentication success message to the access point (see FIG. 6, No. 8). In one implementation, the success message may include a Pairwise Master Key (PMK), which is provided to the IEEE 802.1X authenticator. As FIG. 7 illustrates, the wireless client and the access point then generate session keys (e.g., Pairwise Transient Keys (PTKs) according to the IEEE 802.11i standard) (740) (see also FIG. 6, No. 9). As FIG. 7 also illustrates, if the authentication session is unsuccessful (730), the wireless client increments an EAP failure counter and records data characterizing the anomaly, such as the MAC address of the AP with which the wireless client is associated, a time stamp, etc. (750). If the EAP failure counter is under a threshold value (760), the wireless client reinitiates its attempt to establish network access. For example, the wireless client may choose the same or a new access point (780) and start again. However, if the EAP failure counter exceeds the threshold value, the wireless client applies a security policy (770).

The security policy can include one or more actions such as reporting the failure upon the next successful connection attempt, disabling a network interface card of the wireless client or perhaps blacklisting the access point. Obviously, this is just an abbreviated list and the security policy can take multiple forms without departing from the scope of the claimed embodiments. Additionally, the aforementioned security policy description is also applicable to the additional methods that will be described subsequently.

Figure 8:
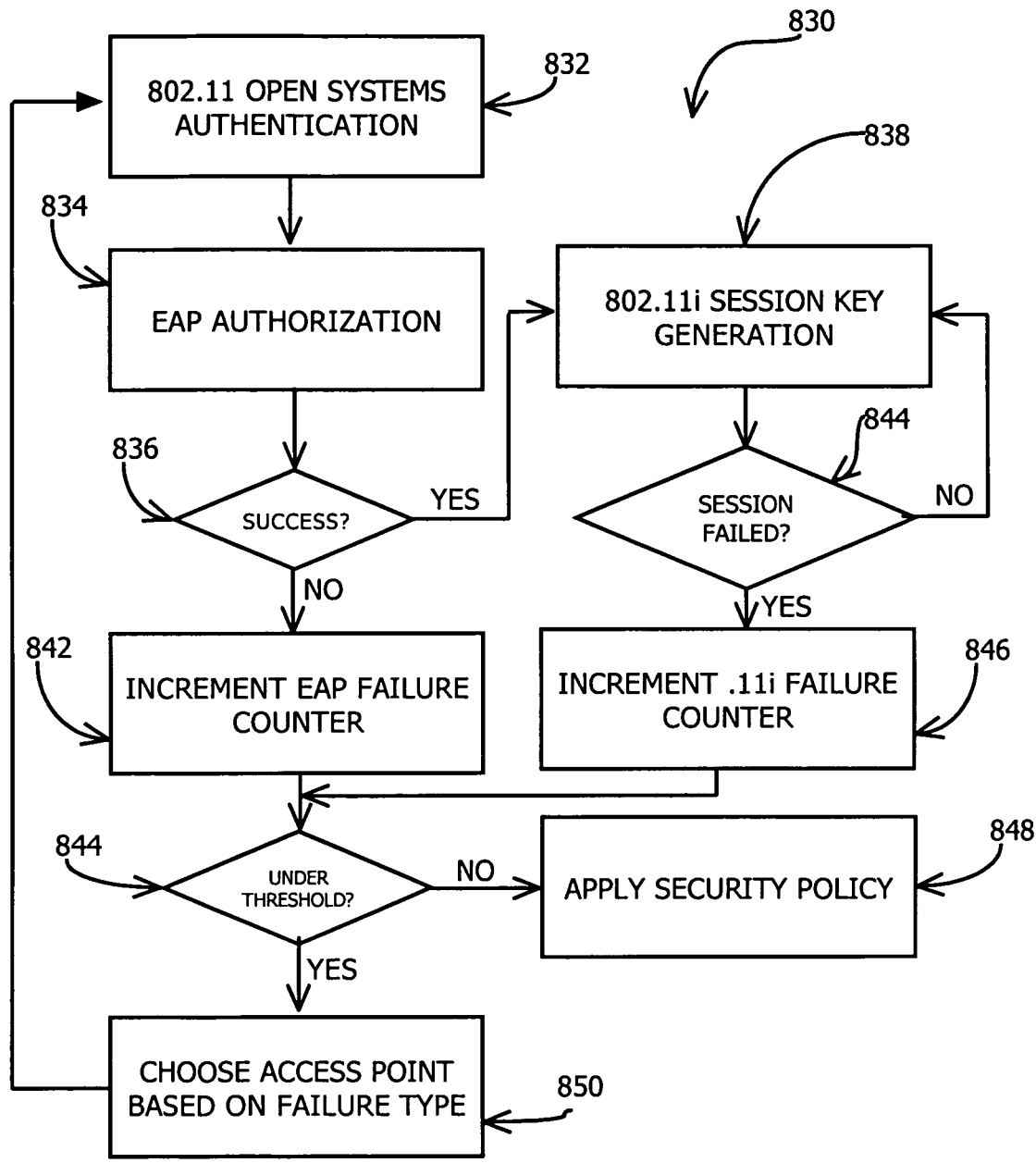
FIG. 8 is a flowchart illustrating another method, implemented by a wireless client, directed to monitoring for anomalies during association with a wireless network infrastructure, in accordance with an exemplary embodiment.

The wireless client can also be configured to monitor for other anomalies, such as 802.11i session failures. FIG. 8 is a flowchart illustrating a method 830 executed by a wireless client, in accordance with an exemplary embodiment, directed to the detection of anomalies while attempting to establish access to the network through a wireless access point. In one embodiment, the method can be implemented by wireless network driver code as a process that monitors various events (e.g., EAP authentication sessions, 802.11i key generations sessions, etc.) associated with establishing network access and conditionally applies one or more security policies based on one or more detected anomalies. As FIG. 6 illustrates, the method, in one embodiment, commences with a wireless client initiating an open systems authentication step 832 with an access point (see FIG. 6, Nos. 1-6). Upon a successful connection with the access point 50*a,* the access point 50*a* proxies an authentication session (e.g., EAP authentication) between the wireless client and the network authentication server (834) (see also FIG. 6, No. 7). If the wireless client successfully authenticates (836), the network authentication server 20 returns an authentication success message to the access point (see FIG. 6, No. 8). In one implementation, the success message may include a Pairwise Master Key (PMK), which is provided to wireless client. As FIG. 8 illustrates, the wireless client and the access point then generate session keys (e.g., Pairwise Transient Keys (PTKs) according to the IEEE 802.11i standard) (838) (see also FIG. 6, No. 9). As FIG. 8 also illustrates, if the authentication session is unsuccessful (836), the wireless client increments an EAP failure counter (842) and records data characterizing the anomaly, such as the MAC address of the AP with which the wireless client is associated, a time stamp, etc. (750). If the EAP failure counter is under a threshold value (844), the wireless client reinitiates its attempt to establish network access. For example, the wireless client may choose the same or a new access point (850) and start again. However, if the EAP failure counter exceeds the threshold value, the wireless client applies a security policy (770).

Method 830 differs from method 700 in that a connection/802.11i failure counter is also employed. That is, after a successful connection has been established and it later fails then the connection failure counter will be incremented. For example, a session key generation is completed at step 838. If the session subsequently fails, method 830 proceeds to increment a connection failure counter via decision point 844 and step 846. A current value of the connection failure is then compared to a threshold and a security policy is applied if the current value is above the threshold, via decision point 844 and step 848.

In either case of failure (EAP or connection), if the current values of the two failure counters are below the threshold then an access point will be selected based on the failure type via step 850. In accordance with another embodiment, method 830 employs two thresholds. That is, one threshold for EAP failure counters and a different threshold for connection failures.

Figure 9:
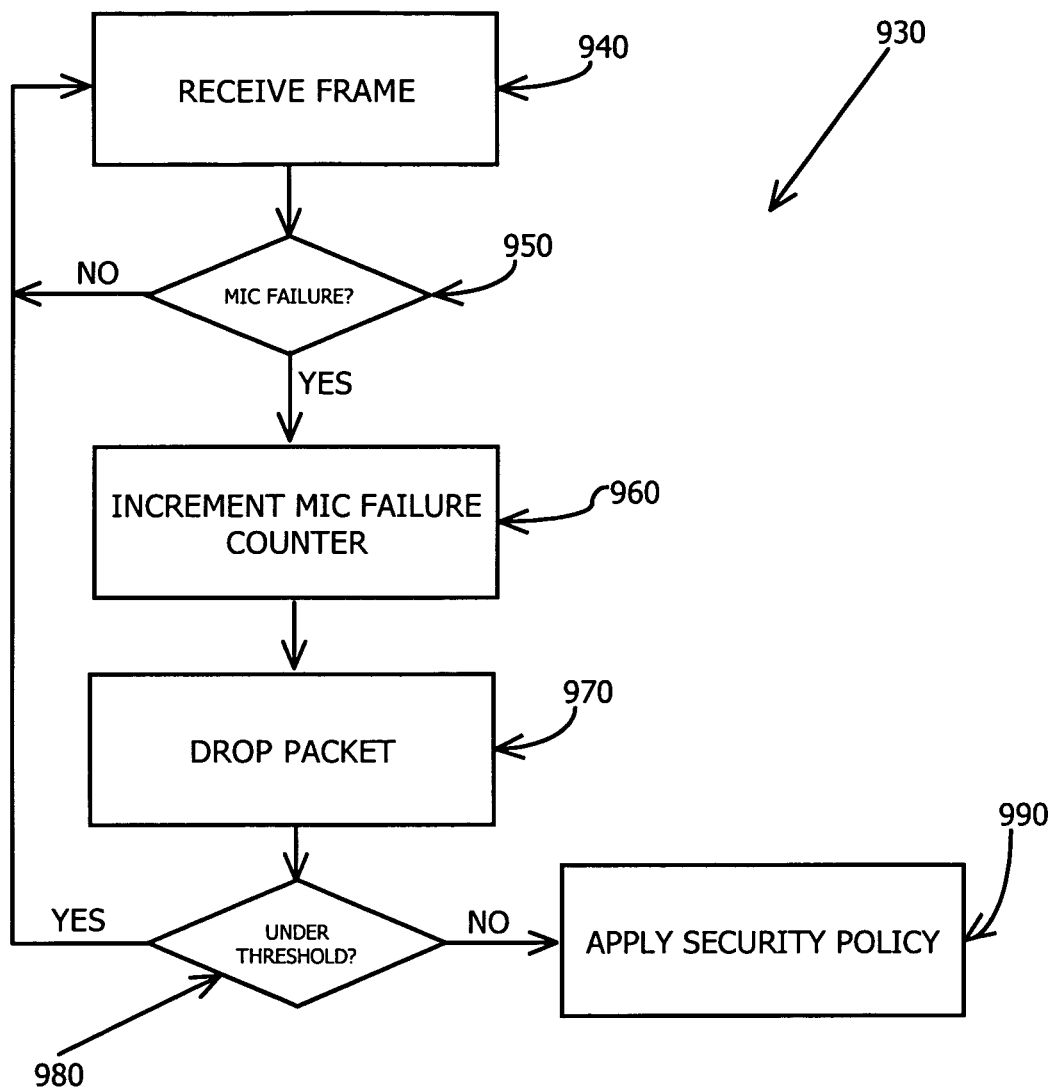
FIG. 9 is a flowchart illustrating yet another method, implemented by a wireless client, directed to the conditional application of security policies responsive to detected MIC failures, in accordance with an exemplary embodiment.

FIG. 9 is a flowchart illustrating yet another method 930 for validating management frames transmitted by an access point and conditionally applying a security policy based on one or more validation errors, in accordance with an exemplary embodiment. Firstly, a frame is received at the wireless client and its validity is verified using a message integrity check (MIC) at step 940 and decision point 950. In addition to verifying the MIC, decision point 950 can also be used to perform a replay protection value check as well. If the MIC is verified, method 930 proceeds back to step 940 to receive a next frame. If the MIC can not be verified (950) then a failure counter is incremented, a packet related to the frame is dropped and a current value of the failure counter is compared to a threshold at steps 960, 970 and decision point 980. If the current value of the failure counter is below the threshold, method 930 proceeds back to step 940 to receive a next frame. Otherwise, a security policy is applied. In accordance with a preferred embodiment, a current value of the failure counter is reduced over a time period if no further MIC failures occur during that period of time.

Figure 10:
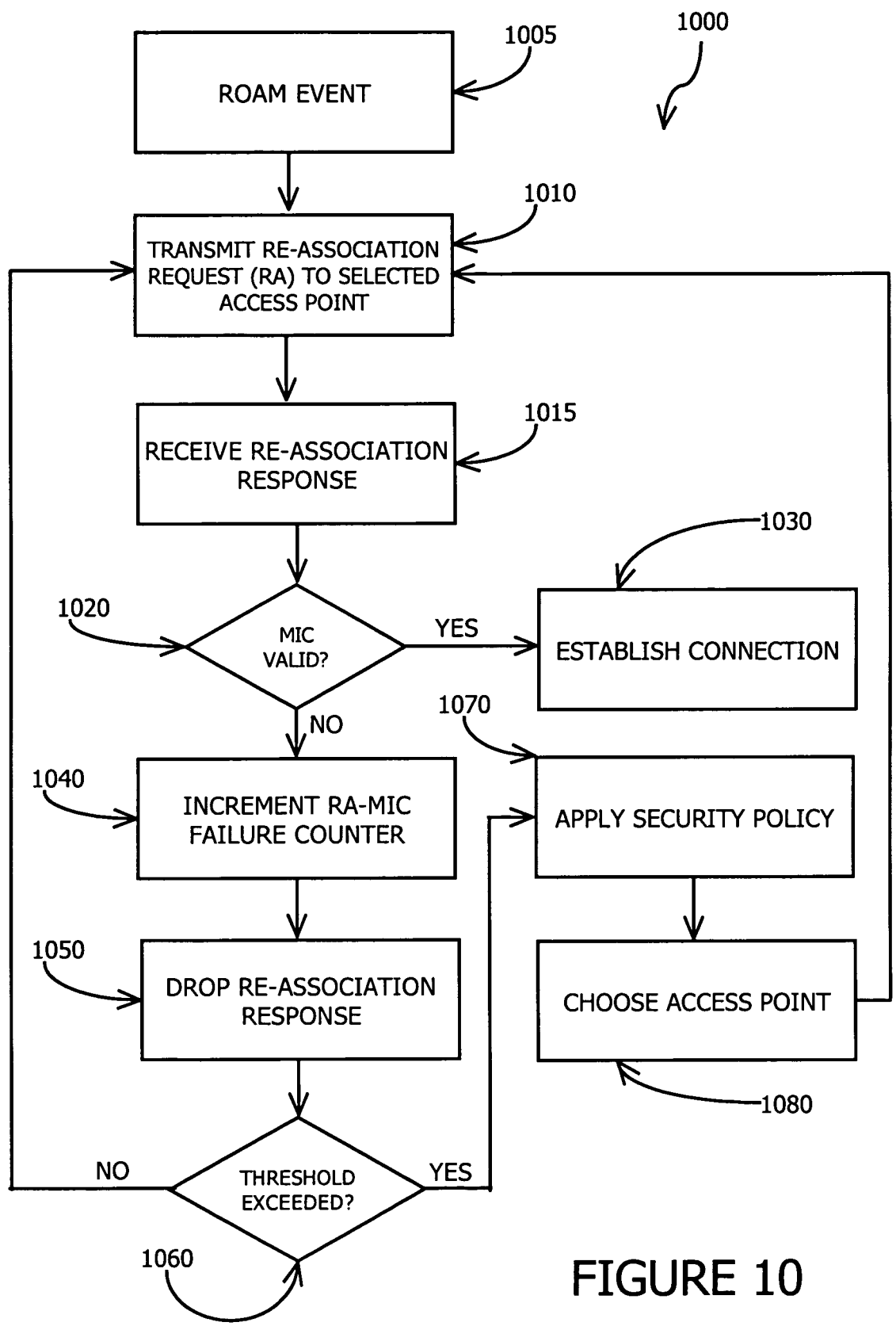
FIG. 10 is a flowchart illustrating an additional method executed by a wireless client during a roam event, in accordance with an exemplary embodiment.

FIG. 10 is a flowchart illustrating an additional method 1000, implemented by a wireless client, directed to validating management frames transmitted by wireless access points during a roam event, in accordance with an exemplary embodiment. The method 1000 begins with a wireless client initiating a roam event, transmitting a re-association request to a selected access point, receiving a re-association response from the access point and verifying if a MIC contained in the re-association response is valid at steps 1005, 1010, 1015 and decision point 1020. If the MIC checks out as valid, then a session is established at step 1030. If the MIC can not be verified, then a failure counter is incremented, the re-association response is dropped and a current value of the failure counter is compared to a threshold at steps 1040, 1050 and decision point 1060. If the current counter value is below the threshold, then method 1000 proceeds back to step 1010. Otherwise, a security policy is applied and another access point is selected at steps 1070 and 1080.

In a related embodiment, a replay protection value is first verified before the message integrity check. If the replay protection value can not be verified, then the received frame can perhaps be stored for later analysis to determine if the frame is a replay protection value attack or a spoofed frame. Verifying the replay protection value tends to be less computationally complex than verifying the MIC and can therefore perhaps be more desirable to verify first.

Figure 11:
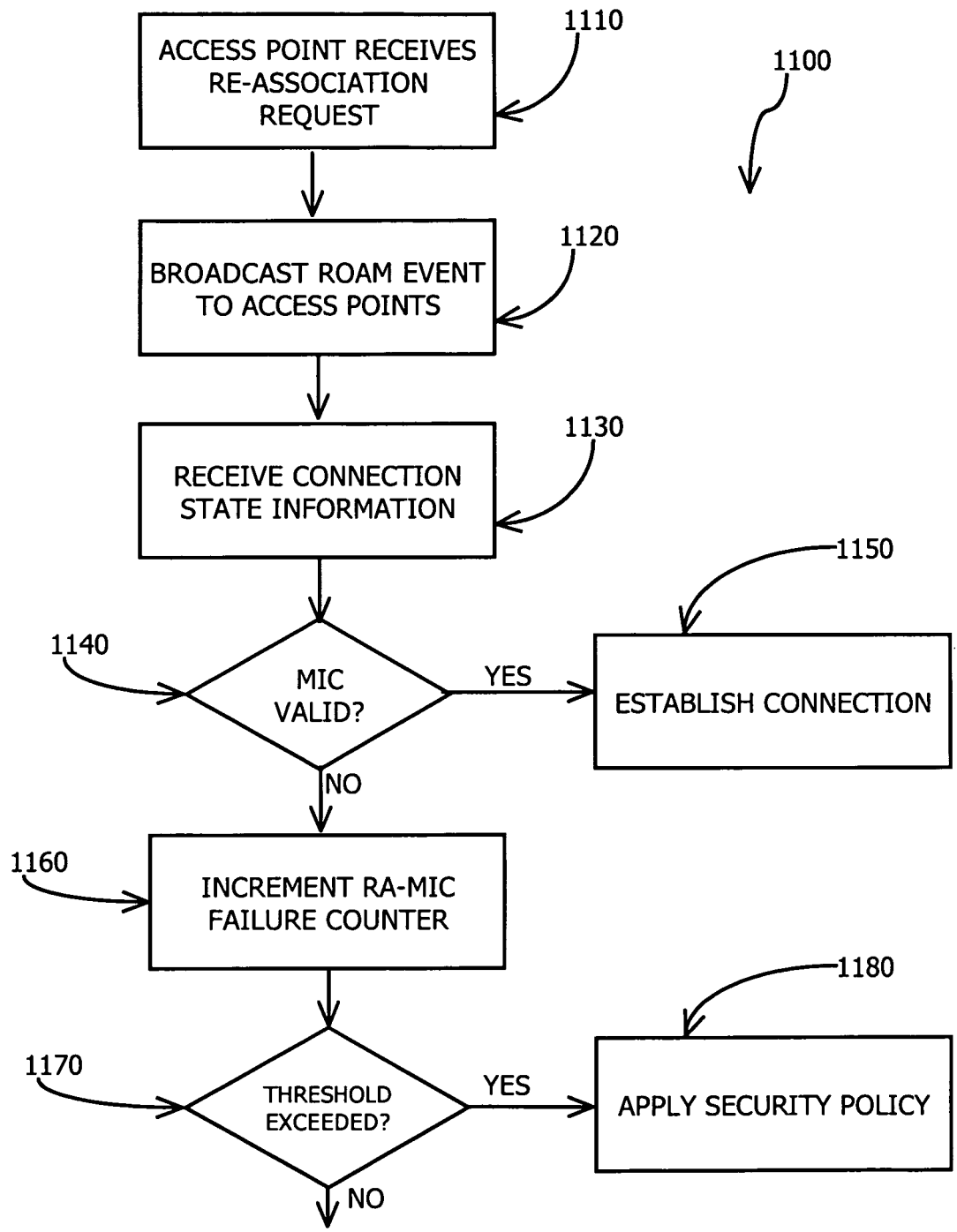
FIG. 11 is a flowchart illustrating a method, implemented by an access point, for conditionally applying a security policy response to MIC failures detected during a roam event.

FIG. 11 is a flowchart illustrating a method 1100, implemented by an access point, during a roam event, in accordance with an exemplary embodiment. To begin, an access point receives a re-association request from a wireless client at step 1110. The access point in turn broadcasts a roam event message to other access points, and connection state information (including the key(s) used to generate the MICs) is received at steps 1120 and 1130. At decision point 1140, a MIC appended to the re-association request is examined using the MIC key received in step 1130. A connection is established if the MIC is verified at step 1150. If the MIC can not be verified then a failure counter is incremented, a current value of the counter is compared to a threshold and a security policy is applied if the current value is above the threshold at step 1150, decision point 1170 and step 1180. If the threshold has not been exceeded then further processing occurs.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. In a wireless client that includes one or more wireless network interfaces for communicating with at least one access point, a method comprising:
 associating the wireless client with a wireless access point;
 authenticating the wireless client to an authentication server; and
 conditionally applying, at the wireless client, one or more security policies based on one or more anomalies detected by the wireless client during the authenticating to the authentication server, wherein at least one of the one or more applied security policies comprises recording data relating to the one or more anomalies and transmitting the data in a report of the one or more anomalies detected by the wireless client to a network in response to the one or more anomalies.

2. The method as recited in claim 1 wherein conditionally applying the one or more security policies comprises:
 incrementing a failure counter if authenticating to the authentication server fails; and
 applying the one or more security policies if a current value of the failure counter is above a threshold.

3. The method as recited in claim 1 wherein the one or more security policies further comprises disabling a wireless network interface of the one or more wireless network interfaces of the wireless client.

4. The method as recited in claim 1 wherein reporting the failure comprises reporting an authentication failure event that occurred at a next successful authentication.

5. The method as recited in claim 1 further comprising:
 generating a session key with the wireless access point; and
 conditionally applying, at the wireless client, the one or more security policies based on a failure to generate the session key.

6. The method as recited in claim 5 wherein conditionally applying the one or more security policies comprises:
 incrementing a session key failure counter if a successful key generation session fails; and
 applying the one or more security policies if a current value of the authentication failure counter or a current value of the session key failure counter is above a threshold.

7. The method as recited in claim 6 wherein the threshold comprises an authentication failure counter threshold and a session key failure threshold.

8. The method as recited in claim 5 wherein the one or more security policies further comprises disabling a wireless network interface of the wireless client.

9. A wireless client comprising:
a wireless network interface;
one or more processors;
a memory;
a wireless network interface driver application, stored in the memory, including instructions operable to cause the one or more processors and the wireless network interface to:
associate the wireless client with a wireless access point;
authenticate the wireless client to an authentication server; and
conditionally apply, at the wireless client, one or more security policies based on one or more anomalies detected by the wireless client during the authenticating to the authentication server, wherein at least one of the one or more applied security policies comprises recording data relating to the one or more anomalies and transmitting the data in a report of the one or more anomalies detected by the wireless client to a network in response to the one or more anomalies.

10. The wireless client as recited in claim 9 wherein to conditionally apply the one or more security policies the wireless network interface driver application further comprises instructions operative to cause the one or more processors and the wireless network interface to:
increment a failure counter if authenticating to the authentication server fails; and
apply the one or more security policies if a current value of the failure counter is above a threshold.

11. The wireless client as recited in claim 9 wherein the one or more security policies further comprises disabling the wireless network interface.

12. The wireless client as recited in claim 9 wherein reporting the failure comprises reporting an authentication failure event at a next successful authentication.

13. The wireless client of claim 9 wherein the wireless network interface driver application further comprises instructions operative to cause the one or more processors and the wireless network interface to:
generate a session key with the wireless access point; and
conditionally apply the one or more security policies based on a failure to generate the session key.

14. The wireless client as recited in claim 13 wherein to conditionally apply the one or more security policies, the wireless network interface driver application further comprises instructions operative to cause the one or more processors and the wireless network interface to:
increment an authentication failure counter if authenticating to the authentication server fails;
increment a session key failure counter if a key generation session fails; and
apply the one or more security policies if a current value of the authentication failure counter or a current value of the session key failure counter is above a threshold.

15. The wireless client as recited in claim 14 wherein the threshold comprises an authentication failure counter threshold and a session key failure threshold.

16. The wireless client as recited in claim 13 wherein the one or more security policies further comprises recording a session key generation session failure, and disabling the wireless network interface.

17. A computer-readable storage medium encoded with computer executable instructions, the computer executable instructions when executed operable to cause a processor and a wireless network interface to:
establish a wireless network connection between a wireless client and a wireless access point;
authenticate the wireless client to an authentication server; and
conditionally apply, at the wireless client, one or more security policies based on one or more anomalies detected by the wireless client during the authenticating to the authentication server, wherein at least one of the one or more applied security policies comprises recording data relating to the one or more anomalies and transmitting the data in a report of the one or more anomalies detected by the wireless client to a network in response to the one or more anomalies.

* * * * *